US010127667B2

(12) United States Patent
Kennedy et al.

(10) Patent No.: US 10,127,667 B2
(45) Date of Patent: Nov. 13, 2018

(54) IMAGE-BASED OBJECT LOCATION SYSTEM AND PROCESS

(71) Applicant: LocusLabs, Inc., Oakland, CA (US)

(72) Inventors: Campbell O. Kennedy, Oakland, CA (US); Jason D. McMinn, Redwood City, CA (US)

(73) Assignee: LocusLabs, Inc., Oakland, CA (US)

( * ) Notice: Subject to any disclaimer, the term of this patent is extended or adjusted under 35 U.S.C. 154(b) by 0 days.

(21) Appl. No.: 14/817,026

(22) Filed: Aug. 3, 2015

(65) Prior Publication Data

US 2016/0035094 A1 Feb. 4, 2016

Related U.S. Application Data

(60) Provisional application No. 62/032,309, filed on Aug. 1, 2014.

(51) Int. Cl.
*G06T 7/00* (2017.01)
*G06T 7/73* (2017.01)

(52) U.S. Cl.
CPC .............. *G06T 7/0042* (2013.01); *G06T 7/73* (2017.01); *G06T 2207/30232* (2013.01)

(58) Field of Classification Search
None
See application file for complete search history.

(56) References Cited

U.S. PATENT DOCUMENTS

| | | |
|---|---|---|
| 8,649,565 B1 | 2/2014 | Kim et al. |
| 8,705,893 B1 | 4/2014 | Zhang et al. |
| 2002/0107674 A1* | 8/2002 | Bascle .................... G06F 3/011 703/1 |
| 2004/0167716 A1* | 8/2004 | Goncalves ............ G01C 21/12 340/995.1 |
| 2012/0237085 A1* | 9/2012 | Meier ................... G06K 9/3216 382/103 |
| 2014/0005933 A1 | 1/2014 | Fong et al. |
| 2014/0120945 A1* | 5/2014 | Sharma ................ H04W 4/043 455/456.1 |
| 2014/0240469 A1* | 8/2014 | Lee ....................... H04N 13/025 348/48 |
| 2014/0267703 A1* | 9/2014 | Taylor ....................... G06T 7/73 348/139 |
| 2015/0071524 A1* | 3/2015 | Lee ........................ G06T 7/0075 382/154 |
| 2015/0227644 A1* | 8/2015 | Schultz ............... G06F 17/5004 703/1 |
| 2015/0363647 A1* | 12/2015 | Perez .................. G06K 9/00671 345/633 |
| 2017/0255203 A1* | 9/2017 | Sofman ................ G05D 1/0274 |

OTHER PUBLICATIONS

International Search Report and Written Opinion for PCT/US2015/043480, "Image-Based Object Location System and Process," Applicant: LocusLabs IP, dated Oct. 29, 2015, 5 pages.

\* cited by examiner

*Primary Examiner* — Delomia L Gilliard
(74) *Attorney, Agent, or Firm* — P. Scott Born; Foster Pepper PLLC

(57) ABSTRACT

A camera image, associated pose, and range data are applied as inputs to a floor plan generation process, which outputs a venue floor plan. The camera image, associated pose, and venue floor plan are input to a data extraction process, which outputs feature geo-location and metadata information to a data storage mechanism.

11 Claims, 4 Drawing Sheets

IMAGE-BASED OBJECT LOCATION SYSTEM AND PROCESS

CROSS-REFERENCE TO RELATED APPLICATIONS

This application claims priority to U.S. Provisional Patent Application Ser. No. 62/032,309 filed Aug. 1, 2014, which is incorporated by reference as if fully set forth herein.

FIELD OF THE INVENTION

The present invention relates generally to map making and more particularly to geospatial data processing for deriving object location information.

BACKGROUND OF THE INVENTION

Recording the exact locations of items, stores or environmental attributes and infrastructure inside venues currently requires someone to obtain a map or building plans of a particular venue and then physically visit the venue. Once there, the person must orient him or herself with the map, possibly measure distances to the place or object of interest, and mark the location on the map or plans. This time consuming and inconvenient process also presents opportunities for inaccurate location information. Accordingly, there is a need for an efficient and accurate technique for identifying locations of objects for referencing and plotting on maps.

BRIEF SUMMARY OF THE INVENTION

According to an embodiment of the invention, an image-based object location system includes an image generator for producing an image containing information, a position and orientation identifier for accessing the information associated with the image and generating position and orientation information for at least a portion of the image, a floor plan generator for generating a floor plan based on the image, a feature identifier for extracting feature-related data from the image and the position and orientation information, and a database for storing the feature-related data.

According to another embodiment of the invention, an image-based object location process includes the steps of receiving information form an image, accessing the information associated with the image and generating position and orientation information for at least a portion of the image, generating a floor plan based on the image, extracting feature-related data from the image and the position and orientation information, and storing the feature-related data.

BRIEF DESCRIPTION OF THE DRAWINGS

Preferred and alternative examples of the present invention are described in detail
below with reference to the following drawings.

DETAILED DESCRIPTION OP THE INVENTION

Figure 1:
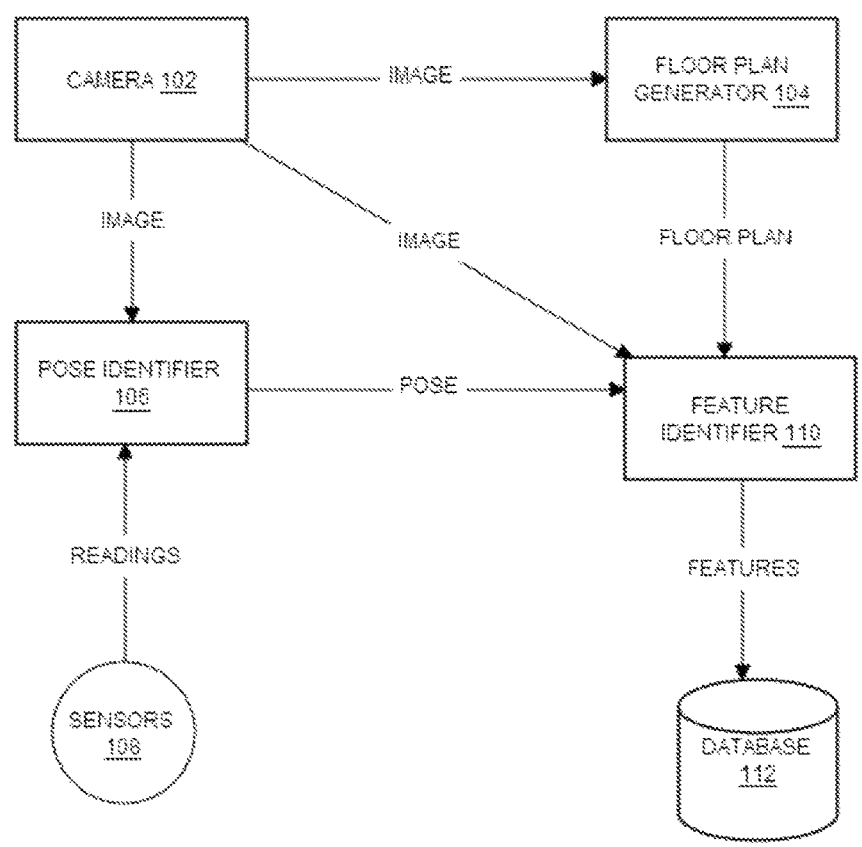
FIG. 1 is a system diagram of an embodiment of an image-based object location system.

This patent application describes one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms.

Embodiments of the invention may be operational with numerous general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Embodiments of the invention may be described in the general context of computer-executable instructions, such as program modules, being executed by a computer and/or by computer-readable media on which such instructions or modules can be stored. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Embodiments of the invention may include or be implemented in a variety of computer readable media. Computer readable media can be any available media that can be accessed by a computer and includes both volatile and nonvolatile media, removable and non- removable media. By way of example, and not limitation, computer readable media may comprise computer storage media and communication media. Computer storage media include volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also he included within the scope of computer readable media.

According to one or more embodiments, the combination of software or computer-executable instructions with a computer-readable medium results in the creation of a machine or apparatus. Similarly, the execution of software or computer-executable instructions by a processing device results in the creation of a machine or apparatus, which may be distinguishable from the processing device, itself, according to an embodiment.

Correspondingly, it is to be understood that a computer-readable medium is transformed by storing software or computer-executable instructions thereon. Likewise, a processing device is transformed in the course of executing software or computer-executable instructions. Additionally, it is to be understood that a first set of data input to a processing device during, or otherwise in association with, the execution of software or computer-executable instructions by the processing device is transformed into a second set of data as a consequence of such execution. This second data set may subsequently be stored, displayed, or otherwise communicated. Such transformation, alluded to in each of the above examples, may be a consequence of, or otherwise involve, the physical alteration of portions of a computer-readable medium. Such transformation, alluded to in each of the above examples, may also be a consequence of, or otherwise involve, the physical alteration of for example, the states of registers and/or counters associated with a processing device during execution of software or computer-executable instructions by the processing device.

As used herein, process that is performed "automatically" may mean that the process is performed as a result of machine-executed instructions and does not, other than the establishment of user preferences, require manual effort.

In accordance with a preferred embodiment of the present invention, an image-based object location system and process reduces the time and effort spent onsite by capturing many images and their locations. The extraction of physical features may be performed by a technician at his/her desk. The physical feature extraction can be performed at any time, and the technician can go back to the field data at a later time for reference. Alternatively, computer vision pattern matching techniques can be applied to facilitate the process.

Geo-referencing via ground-truth control points can occur at many points on a single dataset, causing the process to be faster and potentially more accurate than traditional methods.

For purposes of clarity, the following terms used herein generally have the meanings set forth below. "Camera" refers to a device that records images and/or video, either as analog or as digital information signals. ""Image" refers to information captured and stored by a device representing a visual perception, usually a two-dimensional picture. Images may be captured, stored, and communicated by devices in either analog or digital formats. "Video" refers to information captured and stored by a device representing a sequence of moving pictures. Video may be captured, stored, and communicated by devices in either analog or digital formats. A recording produced with a video recorder (such as a camcorder or smart phone) or some other device that captures full motion (sensor) in this context refers to a device or composition of matter that responds to a physical stimulus (as heat, light, sound, pressure, magnetism, or a particular motion) and transmits a resulting impulse (as for measurement or operating a control). "Mobile application" in this context refers to logic or software designed to run on smartphones, tablets, computers and other mobile devices. "Laptop" in this context refers to a portable personal computer with a clamshell form factor, suitable for mobile use. Laptops are also sometimes called notebook computers or notebooks. Other terms, such as ultrabooks or netbooks, refer to specific types of laptop/notebook. "Laser" refers to light sources that generate light in a directional state and thus emit light in directional beams. Most lasers are intrinsically polarized without loss. "Pixel" refers to the smallest visual unit in an electronic display or visual data file; that is, as single point. A pixel is the smallest piece of information on an image. This is a unit for measuring image resolution, and the more pixels a picture consists of the more detailed it is. "Metadata" refers to data.

In accordance with the system and process of the present invention, an accurate and information-rich indoor mapping, wayfinding, and search solution for indoor venues is described below.

Maps and spatial content are more accurate and are based on field-collected models of the indoor space. The resulting maps are more information-rich, allowing users, for example, to search and find drinking fountains, seating areas, plug outlets, products (such as, headphones, coffee, etc.). Content is built with consistency and at scale. Reality capture technology allows the collection of data at scale. Semi-automated map-making workflow allow building the content fast. The maps and spatial information provided in accordance with an embodiment of the present information may be kept up-to-date as a service to users. Further, mobile and web-based user interfaces may be utilized for interactive maps, navigation directions, travel times, indoor positioning, and product-level search.

Field information may be collected is a variety of ways, including, for example, by using a cart that is moved through publically accessible areas of the venue. The cart may be equipped with cameras and range finding equipment, and other location and data gathering equipment, such as for example, a 270-degree field-of-view laser range finder, three high frame rate cameras, an inertial measuring unit (IMU), and a laptop computer.

Software running in real-time on the laptop uses a series of estimation algorithms and a flavor of a particle filter to combine sensor readings in time sequence to produce a "SLAM map". A SLAM map is essentially a rough rendering of a floorplan using a local coordinate system and may be either a 2D or 3D model.

Field collection process produces a series of "runs". A run is SLAM map, a series of images, a series of poses (position+orientation) each of which corresponds to an image, and operator field notes.

Map and content workflow. The output of the map workflow is a geo-registered, consumer-facing map in the form of a scalar-vector file with each point-of-interest (POI) within having a unique identifier. The output also preferably includes, for example, a database of places, objects, infrastructure, etc. and their associated metadata including geometry, location, and categorical information.

SLAM maps from various parts of the building are aligned with each other and with the world. The geo-registration process is performed in a drawing or GIS application, such as Adobe Illustrator® or ESRI® Suite by overlaying the SLAM maps onto satellite imagery. Overlapping portions of the SLAM maps are aligned with each other and overlapping portions of the SLAM maps with the satellite imagery by identifying common features in the geometry, as well as referencing the store-side images for common features in the satellite images. Then, the outlines of the combined SLAM maps are manually traced to create an accurate vector representation of the interior floorplan. Alternatively, a modified SLAM algorithm may he used to align the various SLAM maps to each other automatically.

Next, the extents of individual POIs are outlined. For example, a single flat wall may contain several store facades. A plug-in tool that embeds inside Adobe Illustrator® or other suitable application, overlays the image poses on the map. By way of illustrative examples of the process according to an embodiment of the invention the map technician clicks on the marker, the corresponding image is displayed in a window; when the technician clicks or draws anywhere on the images, a corresponding line or marker appears on the map canvas with the corresponding geo-coordinates, when a the technician draws the outline of a storefront within an image, or series of images, this outline appears on the map, and when the technician clicks on an ATM in an image and selects the POI type, an ATM icon appears in that location on the map. This is accomplished by using an affine transformation to transform the depth map coordinates to geo-coordinates on the map.

For each POI, a name, category, and list of keyword attributes among other metadata is added to the database. A content technician views the pictures near and inside each POI and enters keywords into the database based on what is seen in the image.

For example a product or item seen in the picture, such as a set of headphones, can be clicked on and labeled by the technician. This action automatically populates the database with a POI that is the electronics section of a store. Alternatively, image pattern recognition techniques may programmatically identify logos and features in the images to populate POIs in the database in lieu of the technician viewing and clicking the pictures. In accordance with an embodiment of the present invention, a software component is embedded in mobile applications and provides a user interface and location information about where a mobile device is and what is around it.

The output of the system and process according to an embodiment of the present invention may be used by end users for a variety of applications and purposes. By way of example, users and developers may identify two or more POIs, and an optimal route and turn-by-turn directions through indoor and outdoor spaces is provided, along with POIs, products and other meta-information in proximity to the route. Users and developers may search for business names, products and other meta-information and return these result based on where the user is or where the user may need to go later.

Preferably, the indoor location of the mobile device is computed by performing trilateration of radio signals from Bluetooth emitter devices (beacons), or other similar devices, placed in a venue.

Analytics. In accordance with further embodiments of the invention, and as illustrated by way of an airline passenger example, use search terms, locations viewed on the map, navigation actions, exact location, and other information such as passenger flight itinerary are transmitted to a server and stored. This data may be tied to a particular user or mobile device, or may be anonymous and occur—in the background. Future passenger destinations may be estimated based on search and navigation analytics combined with information, such as passenger flight itinerary.

An analytics dashboard displays metrics about how often people pass by a particular store, or product, how much time they spend in and around, and whether a particular impression or search result displayed to a user resulted in a store visit.

A location dashboard interface allows an airline (for example) to type the name of a passenger into a field and display the passenger's exact location, how much time they will need to get to their destination, and how long they have been at that location. Airlines may also, for example, make decisions as to whether a particular passenger will be able to make their flight and potentially sell their seat and rebook them.

In accordance with a further embodiment of the present invention, as heatmap dashboard displays the frequency at which mobile users visit locations indoors or particular POIs over a time period. A similar virtual heatmap can be generated which shows the frequency at which certain locations on the map are viewed over a time period. Further, using users' location and time, the time it takes to get from one location to another on average may be computed. This information may be used, for example, to report current security and customs line wait times.

Image-based location extraction allows locations of places and objects to be determined and stored from previously recorded images of these places and objects. The locations of these places and objects may then be communicated to people who are looking for them. According to a preferred embodiment of the present invention, an image-based object location system and process involves at least some of the following components and signals: Camera image, Estimated pose (position & orientation) associated with the image, Range data associated with the pose of the image, Floor plan model generation, Venue floor plan model (2D or 3D), Data extraction, Feature information, and Data storage mechanism, such as a database.

The camera image, associated pose, and range data are applied as inputs to the floor plan generation process, which outputs the venue floor plan. The camera image, associated pose, and venue floor plan are input to the data extraction process, which outputs feature information to the data storage mechanism.

In one embodiment of the present invention, involving mobile applications, a camera image is obtained using a camera sensor on a mobile device (e.g. a smartphone, iPad, or laptop computer). The camera image may be composite information obtained via multiple cameras on a field acquisition system, as well as from off-the-shelf mobile smartphones.

An estimated pose associated with the image is derived from one or more sensor readings collected at the same time as the camera image. The sensor readings may be derived from signals from inertial sensors and lasers on a field acquisition system, as well as from off-the-shelf mobile smartphones.

Range data associated with the image may be measured or derived using one or more sensor readings collected at the same time as the camera image, for example using time-of-flight laser readings from a field acquisition system. Other sensing techniques for obtaining range data could include structured light sensing systems (for example, Microsoft Kinect®) and stereo vision systems. In some embodiments range data may be derived using as customized variation of photogrammerty techniques. An operator identifies the same object in two (or more) different images of the object taken at different known poses. A ray is projected out from each image toward the identified object, and the point of intersection of the rays establishes the third point of a triangle. Trigonometry is then used to obtain the range data.

In accordance with an embodiment the floor plan is generated from machine logic, controlled by a human operator. An initial automated process attempts to link sets of discrete range readings using distance thresholds and other distance-based heuristics to form a set of vectors. These automatically generated vectors along with the range readings and camera images in their associated poses, and possibly other data inputs, are viewed by the operator in a graphical user interface. The operator modifies the vectors to form the venue floor plan and planes associated with the interior walls. The venue floor plan model may be generated or modified using the processes described above. It may also be supplied by logic such as a CAD building diagram, and fed into the process.

Data extraction logic accepts inputs of the camera image, associated pose, and venue floor plan model, and processes these inputs into feature information about the physical world as an output. Groups of pixels in an image are identified as corresponding to a real-world object, such as a store front, ticket kiosk, plug outlet, or consumer packaged product. In one embodiment a human operator uses machine logic to view the camera image and "draw" around the outline of the object of interest using a mouse. This process may be enhanced programatically by employing logic that implements thresholding techniques to identify groupings of adjacent pixels that do not vary drastically in color shade. This allows human operators to more efficiently identify objects with fewer clicks than the "outlining" method alone. Pixel groupings corresponding to objects in the camera image may also be identified by known computer-vision techniques that employ variations of pattern-matching from an image database to identify objects in images.

Once the groups of pixels in an image are identified, a ray-tracing technique is used starting at the location (pose) of the camera, and projected through each object pixel in the image until an intersection is reached with the venue floor plan model. These intersection points in the floorplan model represent the location of the object in the model.

The operator may input other attributes about the object via a machine user interface, such as the common name for the object, brand information, store hours and other metadata. This metadata, along with the precise location of the object and associated pixels, form feature Information for that object. The feature information is stored into a database that is optimized for searches, based on metadata attributes and location.

Figure 2:
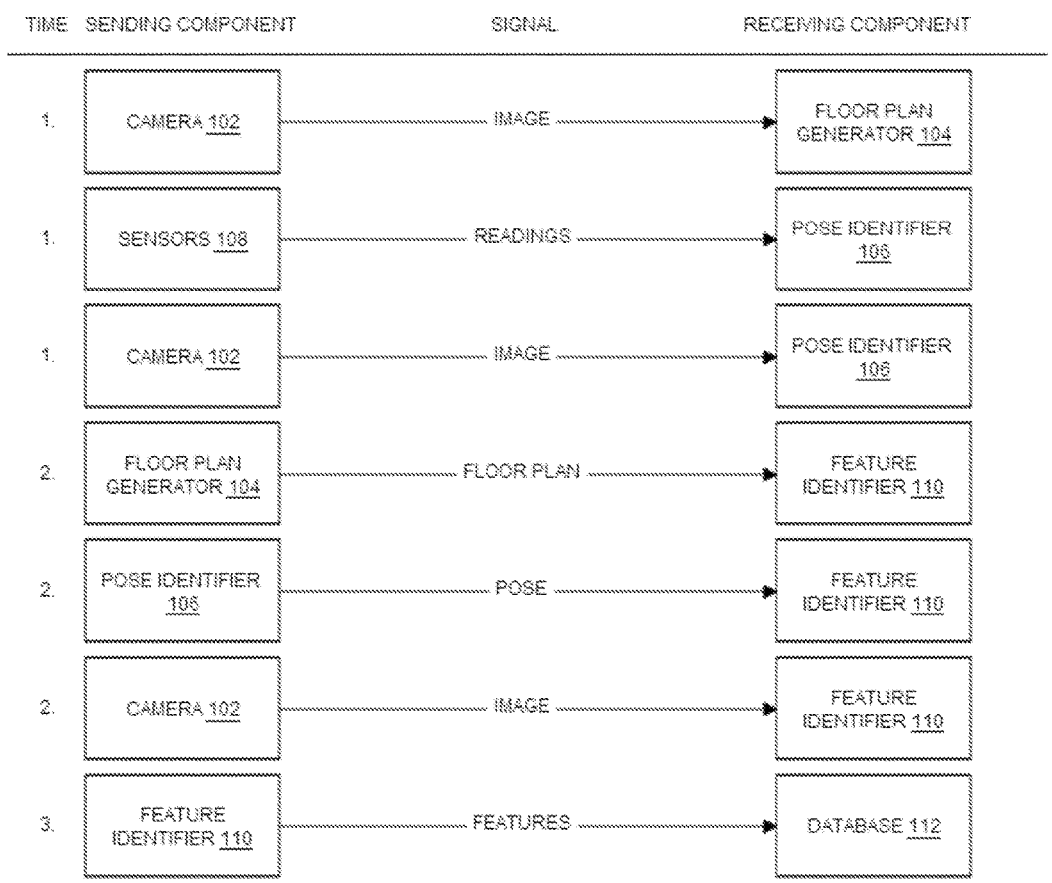
FIG. 2 is an action flow diagram of an embodiment of an image-based object location process.
Figure 3:
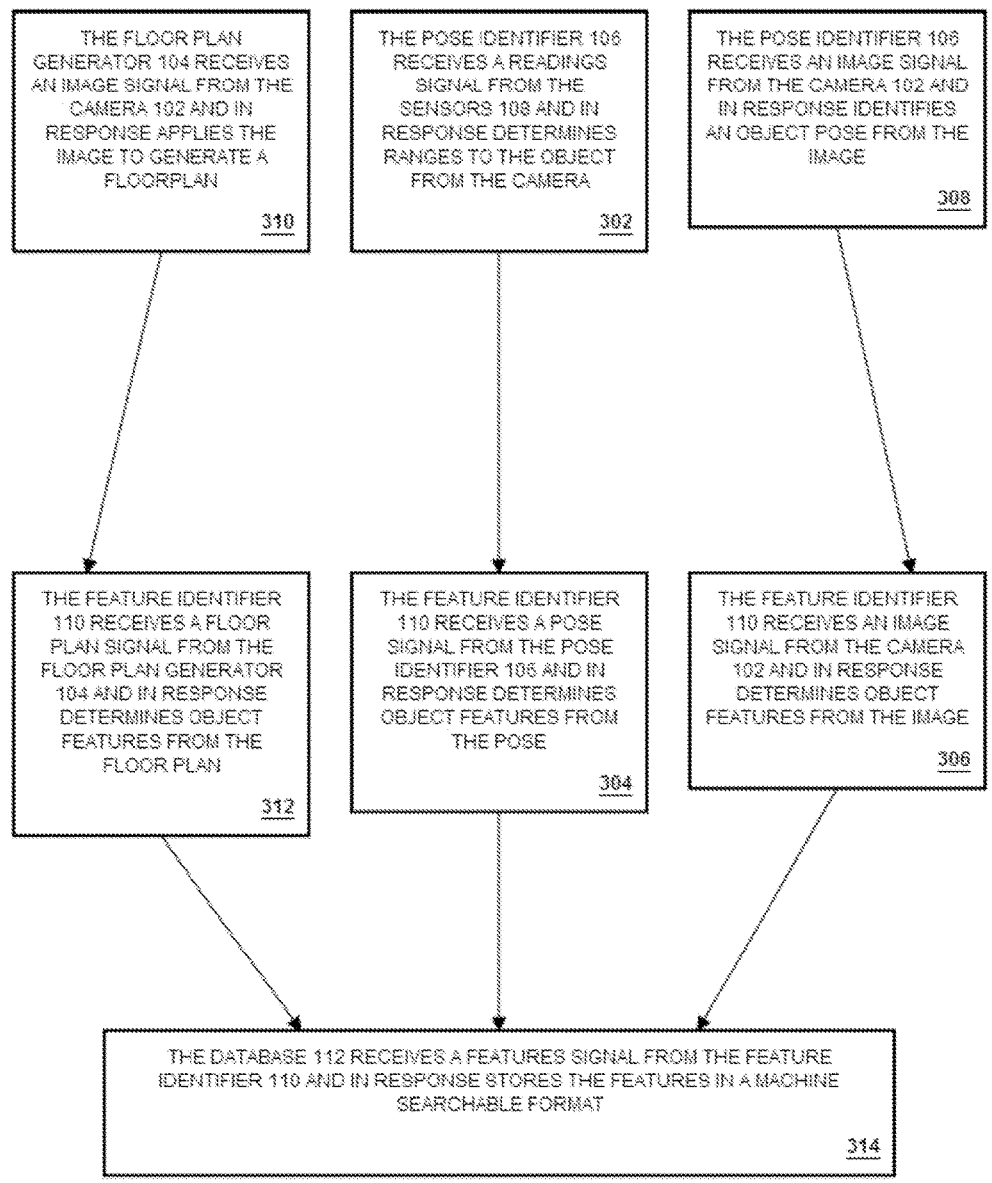
FIG. 3 is a flow chart of an embodiment of an image-based object location process; and, FIG. 4 is schematic diagram illustrating a machine system for implementing aspects of an embodiment of an image-based object location system.

Referring to FIGS. 1-3, the system and process according to one embodiment comprises camera 102, floor plan generator 104, pose identifier 106, sensors 108, feature identifier 110, and database 112. The floor plan generator 104 receives an image signal from the camera 102 and in response applies the image to generate a floorplan (310). The pose identifier 106 receives a readings signal from the sensors 108 and in response determines ranges to the object from the camera (302). The pose identifier 106 receives an image signal from the camera 102 and in response identifies an object pose from the image (308). The feature identifier 110 receives a floor plan signal from the floor plan generator 104 and in response determines object features from the floor plan (312). The feature identifier 110 receives a pose signal from the pose identifier 106 and in response determines object features from the pose (304). The feature identifier 110 receives an image signal from the camera 102 and in response determines object features from the image (306). The database 112 receives a features signal from the feature identifier 110 and in response stores the features in a machine searchable format (314).

Figure 4:
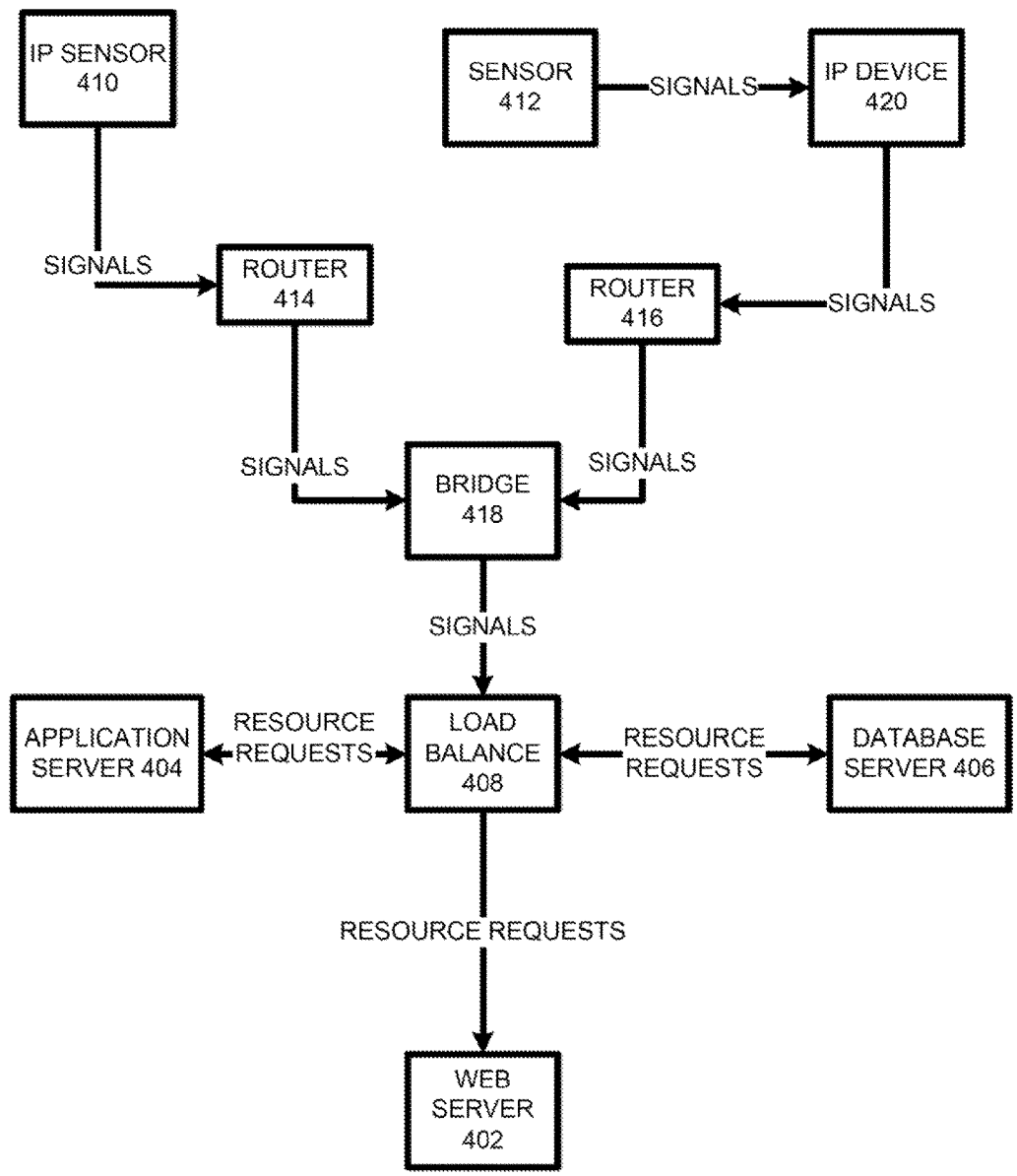

FIG. 4 illustrates an embodiment a machine system to implement image-based object location. An IP sensor 410 (e.g., a camera) responds to a physical stimulus from the environment (light signals) with output signals that represent the physical stimulus (e.g., an image or video). The signal is output in Internet Protocol (IP) format (for example), and propagated via a router 414 and a bridge 418 to a server system. Another sensor 412 (e.g., a range finding laser) does not have IP protocol capability and so outputs signals in a different (e.g., analog or non-IP digital) format to an IP-enabled device 420 which converts the signals output by the sensor 412 into an IP protocol and communicates them via a router 416 and bridge 418 to the server system. The server system inn this example comprises a number of separate server devices, typically each implemented in the separated machine, although this is not necessarily the case. The signals from the sensors are provided via a load balancing server 408 to one or more application server 404 and one or more database server 416. Load balancing server 408 maintains an even load distribution to the other server, including web server 402, application server 404, and database server 406. In one implementation of an image-based object location system, the application server 404 may implement pose analysis, floor plan generation, and object feature extraction, and the database server 406 may implement feature storage. Each server in the drawing may represent in effect multiple servers of that type. The signals from the sensors 410, 412 influence one or more processors of the application server 404 to carry out various transformations as described herein. Database server 406 may provide signals in response to resource request indicative of object features. The signals applied to the database server 406 may cause the database server 406 to access and certain memory addresses, which correlates to certain rows and columns in a memory device. These signals from the database server 406 may also be applied to application server 404 via the load balancing server 408. The system may supply signals to the web server 402, which in turn converts the signals to resources available via the Internet or other WAN by devices of users of the system (client devices).

Image-based location extraction utilizes, but is not limited to, an image or set of images having an associated pose (position & orientation) associated range data to objects in the image, for at least a portion of the image. The image is viewed by an operator through a software user interface—or—analyzed by a machine vision algorithm capable of segmenting objects or patterns in the image. The pixel or pixel areas associated with a place or object are identified. The software process computes a location for the identified object using these inputs and stores an association between the item identified, its computed location, and optionally the object's geometry. Optionally, additional attributes and metadata, such as color or surrounding objects, input via the user interface may be associated with the object and stored.

To perform image-based location extraction, the operator would obtain a depth image using some type of data acquisition procedure. The operator would then load this depth image into the software process mentioned using a compute device capable of running the Software process. The operator may then click one or more times on the image in or around an object he/she has identified in the image being displayed. The operator would then enter the name, or other identifying information, of the object as text and optionally other metadata.

To produce accurate indoor maps of large venues such as shopping malls and airports. We've implemented this process in-part using a plugin to Adobe Creative Suite® to produce the maps, along with other custom database tools. User interface design may be provided, for example, through a plug-in to Adobe Illustrator®. For purposes of clarity, it is understood that references to "one embodiment" or "an embodiment" do not necessarily refer to the same embodiment, although they may. Unless the context clearly requires otherwise, throughout the description and the claims, the words "comprise," "comprising," and the like are to he construed in an inclusive sense as opposed to an exclusive or exhaustive sense: that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic will vary according to implementation.

The techniques and procedures described herein may be implemented via logic distributed in one or more computing devices. The particular distribution and choice of logic is a design decision that will vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g., read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in variety of forms, and that an illustrative embodiment of the subject matter described herein applies equally regardless of the particular type of signal bearing media used to actually carry out the distribution. Examples of a signal hearing media include, but are not limited to, the following: recordable type media such as floppy disks, hard disk drives, CD ROMs, digital tape, and computer memory.

In a general sense, those skilled in the art will recognize that the various aspects described herein which can be implemented individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modern, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

The invention claimed is:

1. An image-based object location system for generating a human readable map comprising:
   an image generator for producing a plurality of images containing information, wherein the images are of an original place to be mapped;
   a position and orientation identifier for accessing the information associated with the plurality of images and generating position and orientation information of at least a portion of the plurality of images;
   a floor plan generator for generating a floor plan based on the plurality images and position and orientation information;
   a feature identifier for:
      extracting feature-related data from the image, the position and orientation information and the floor plan;
      generating a graphical representation of real-world objects within the floor plan to create a feature map based on the extracted feature-related data, the image information, the position and orientation information, and the floor plan; and
      associating a name, a category, and at least two keyword attributes to each of the real-world objects based on the image, the position and orientation information, and the floor plan; and,
   a database for storing the feature-related data and the name, category, and the at least two keyword attributes for one of the group of real-time retrieval and manual retrieval, wherein each of the name, category and at least two key words attributes is individually searchable to identify and locate the real-world object in the map.

2. An image-based object location process for generating a human readable map comprising the steps of:
   receiving information from an image, wherein the image is of an original place to be mapped;
   accessing the information associated with the image and generating position and orientation information for at least a portion of the image;
   generating a floor plan based on the image and the position and orientation information;
   extracting feature-related data from the image, the position and orientation information and the floor plan;
   processing the image, position and orientation information and floor plan into real-world objects in a map;
   associating a name, a category, and at least two keyword attributes to each of the real-world objects based on the image, the position and orientation information, and the floor plan; and,
   storing the feature-related data and the name, category, and the at least two keyword attributes for one of the group of real-time retrieval and manual retrieval, wherein each of the name, category and at least two key words attributes is individually searchable to identify and locate the real-world object in the map.

3. The system of claim 1, wherein processing the image, position and orientation information and floor plan into the real-world objects in the map further comprises using ray-tracing to determine a location of at least one of the real world objects in the map.

4. The system of claim 1, wherein generating the graphical representation of real-world objects within the floor plan is further based on range data associated with the image.

5. The system of claim 4, wherein the position and orientation identifier is further configured to determine the range data based on the image.

6. The system of claim 4, wherein the system further comprises at least one sensor, wherein the at least one sensor is configured to obtain the range data.

7. The process of claim 2, generating the graphical representation of real-world objects within the floor plan further comprises using ray-tracing to determine a location of the real world objects in the map.

8. The process of claim 2, wherein generating the graphical representation of real-world objects within the floor plan is further based on range data associated with the image.

9. The process of claim 8, wherein the position and orientation identifier is further configured to determine the range data based on the image.

10. The process of claim 8, wherein the system further comprises at least one sensor, wherein the at least one sensor is configured to obtain the range data.

11. The process of claim 2, wherein the associating is performed automatically based on image pattern recognition.

* * * * *